United States Patent [19]

Teranishi et al.

[11] Patent Number: 5,693,365
[45] Date of Patent: Dec. 2, 1997

[54] METHOD FOR FORMING WATER-REPELLENT FILM

[75] Inventors: Toyoyuki Teranishi; Hiroaki Yamamoto; Satoshi Shiiki, all of Osaka-fu; Kazuaki Takada, Aichi-ken; Kazuo Tojima, Aichi-ken; Takashi Itoh, Aichi-ken, all of Japan

[73] Assignee: Nippon Sheet Glass Co., Ltd., Osaka, Japan

[21] Appl. No.: 422,877

[22] Filed: Apr. 17, 1995

[30] Foreign Application Priority Data

Apr. 18, 1994 [JP] Japan ..................... 6-078835

[51] Int. Cl.$^6$ .................... B05D 1/30; B05D 3/04
[52] U.S. Cl. ............... 427/163.1; 427/165; 427/378; 427/379; 427/420
[58] Field of Search ................. 427/163.1, 165, 427/168, 169, 348, 377, 378, 379, 420, 421; 118/326

[56] References Cited

U.S. PATENT DOCUMENTS

| | | |
|---|---|---|
| 3,146,122 | 8/1964 | Renner et al. ............... 117/102 |
| 4,087,568 | 5/1978 | Fay et al. ..................... 427/8 |
| 4,554,177 | 11/1985 | Chikamasa et al. ........... 427/130 |
| 5,266,358 | 11/1993 | Uemura et al. ............ 427/376.2 |
| 5,424,130 | 6/1995 | Nakanishi et al. ............ 428/410 |

FOREIGN PATENT DOCUMENTS

| | | |
|---|---|---|
| 513727 | 11/1992 | European Pat. Off. . |
| 4338137 | 11/1992 | Japan . |
| 4359086 | 12/1992 | Japan . |
| 0524885 | 2/1993 | Japan . |
| 524886 | 2/1993 | Japan . |

*Primary Examiner*—Erma Cameron
*Attorney, Agent, or Firm*—Weiner, Carrier & Burt, P.C.; Joseph P. Carrier; Irving M. Weiner

[57] ABSTRACT

Disclosed is a method for forming a water-repellent film on the surface of a transparent substrate (e.g., sheet glass). While the film on the coated substrate is dried, the temperature is controlled to fall between 15° C. and 25° C., the relative humidity is controlled to be 30% or preferably from 15% to 20%, and the speed of the air stream to be applied to the coated substrate is controlled to be 0.5 m/min or lower. The water-repellent film formed by the invention has a uniform thickness and good abrasion resistance.

4 Claims, No Drawings

METHOD FOR FORMING WATER-REPELLENT FILM

BACKGROUND OF THE INVENTION

1. Field of the Invention

The present invention relates to a method for forming a water-repellent film on the surface of a transparent substrate, especially on the surface of a glass substrate for cars, etc.

2. Description of the Related Art

Water-repellent glass capable of repelling water applied thereto has been proposed and used, for example, as windshields, side-view mirrors, etc. of cars. Such water-repellent windshields or side-view mirrors repel water drops attached thereto, thereby ensuring the visual field of drivers, etc.

For example, a method for forming a water-repellent film on a substrate has heretofore been known, in which a solution of a polydimethylsiloxane or polyfluoroalkyl group-containing compound is coated on the surface of sheet glass, dried and then baked to form thereon a water-repellent film having enlarged contact angles with water drops that may become attached thereto.

The prior art relating to such water-repellent films is disclosed in, for example, Japanese Patent Laid-Open Nos. 4-338137, 4-359086, 5-24885 and 5-24886.

The technique disclosed in Japanese Patent Laid-Open No. 4-338137 is, as summarized in its abstract, to provide "a method for producing water-repellent glass, comprising, in order, a step of preparing a solution comprising a silicon alkoxide represented by Si(OR)4, a substituted silicon alkoxide where a part of the alkoxyl groups have been substituted by fluoroalkyl groups, an alcohol, water, and an acid or base, a step of coating the resulting solution on the surface of a glass substrate to form a film thereon, and a step of baking said film to be a water-repellent film".

The specification of No. 4-338137 says that, according to the disclosed technique, "the alkali resistance of the water-repellent film formed is improved so that the water repellency of the film is kept for a long period of time, while the adhesiveness of the film to the glass substrate is improved".

The technique disclosed in Japanese Patent Laid-Open No. 4-359086 is, as summarized in its abstract, to provide "a method for producing water-repellent glass, comprising coating a coating liquid that is prepared by mixing a vehicle to be obtained by hydrolyzing and polycondensing a metal alkoxide with water in an organic solvent in the presence of a catalyst, with (1) a fluoroalkylsilane of from more than 0.30 mol % to less than 3.0 mol % relative to the amount of the metal alkoxide in said vehicle or with (2) an alkylsilane of from more than 4.0 mol % to less than 20 mol % relative to the amount of the metal alkoxide in said vehicle, on the surface of glass, followed by baking the thus-coated glass".

The specification of No. 4-359086 says that, according to the disclosed technique, it is possible to obtain "a method for producing water-repellent glass coated with a film having good water repellency".

The technique disclosed in Japanese Patent Laid-Open No. 5-24885 is, as summarized in its abstract, to provide "a method for making glass water-repellent, comprising adding water to a mixed solution containing at least one organic metal compound and at least one organic compound having a molecular weight of 130 or more to give an aqueous sol, then coating the resulting sol on the surface of glass, sintering the thus-coated glass to form a transparent metal oxide film thereon, and finally coating a water-repellent layer on said transparent metal oxide film".

The specification of No. 5-24885 says that, according to the disclosed technique, "it is possible to obtain a simple and inexpensive method for making glass water-repellent and resistant to the environment by forming a water-repellent layer on the surface of glass".

The technique disclosed in Japanese Patent Laid-Open No. 5-24886 is to provide "a method for making glass water-repellent, comprising dipping glass in a solution obtained by adding boric acid to an aqueous solution of hydrosilicofluoric acid saturated with silicon oxide to thereby form an SiO2 film on the surface of said glass, making the surface of said glass finely rough, and coating a water-repellent layer on the thus-roughened surface of said glass".

According to the disclosed technique, it is said possible "to obtain a simple and inexpensive method for producing water-repellent glass having excellent durability".

According to the above-mentioned known techniques, a water-repellent film is formed by coating a solution for forming a water-repellent film on the surface of glass, then drying and baking the thus-coated glass to thereby form a water-repellent film on said glass. To coat the coating solution, a dipping method has been disclosed. In addition to this, also known are a spray-coating method, a spin-coating method, a flow-coating method, etc.

The substrate coated by any of these coating methods shall be dried and baked. However, since the drying conditions are not controlled, the prior art techniques often have various problems in that the coated glass is hazed to be cloudy, that the thickness of the water-repellent film formed is uneven and that the abrasion resistance of the water-repellent film formed is poor.

The present invention has been made so as to solve the above-mentioned problems.

We, the present inventors have specifically noticed the conditions for the drying step in the process of forming a water-repellent film, especially the drying temperature and the ambient humidity at the drying step, and have attained the present invention.

The object of the present invention it to provide a method for forming a water-repellent film having a uniform thickness and having high abrasion resistance, on the surface of a substrate such as sheet glass, etc.

SUMMARY OF THE INVENTION

The present invention provides a method for forming a water-repellent film on the surface of a transparent substrate, such as sheet glass for windshields of cars, etc.

The method of the present invention comprises coating a solution for forming a water-repellent film on the surface of a transparent substrate such as sheet glass, then drying and baking the coated substrate to form the water-repellent film thereon. In this method, the conditions for the drying step are controlled to have a temperature of from 15° C. to 25° C. and a relative humidity of 30% or less, preferably from 15% to 20%. To coat a coating solution for forming a water-repellent film on the surface of a substrate such as sheet glass or the like according to the method of the present invention, a flow process is employed where the substrate to be coated is held at its top and bottom, and a coating solution is applied to the top edge of the substrate via a nozzle so as to make the solution flow downward on the surface of the substrate. To dry the thus-coated substrate, an air stream is applied thereto at a blowing speed of 0.5 m/min or less. The coating solution to be used in the present invention for forming a water-repellent film contains tetraethoxysilane and fluoroalkylsilane.

If the drying step is conducted under the controlled conditions as mentioned above, it is possible to prevent the generation of bubbles in the coated film during the drying step. In addition, it is also possible to prevent any excess hydrolysis of the coated film and to prevent the dried film from becoming porous due to insufficient removal of water from the coated film during the drying step. Since the speed of the air stream to be applied to the coated film so as to dry it is controlled to fall within the defined range as above, the thickness of the dried film becomes uniform. In In addition, since the coating solution is applied to the surface of a substrate snob as sheet glass or the like, by a flow process, it is possible to uniformly coat the substrate with the coating solution.

In the method of the present invention, since the drying conditions for the step of drying the solution coated on the surface of a substrate such as sheet glass or the like are controlled to those defined as above, the water-repellent film to be formed on the substrate by baking the dried film in the subsequent baking step has a uniform thickness and has good abrasion resistance.

DETAILED DESCRIPTION OF THE INVENTION

Preferred exemplary embodiments of the present invention are described in detail hereinunder.

According to the present invention, a transparent substrate is coated with a water-repellent film so as to produce, for example, windshields and side-view mirrors of cars, etc. As one embodiment, the present invention provides a method for forming a water-repellent film on the surface of glass for windshields and side-view mirrors of cars. The windshields and side-view mirrors coated with a water-repellent film according to the present invention can repel rain drops, etc. attached thereto and can ensure the visual field of drivers.

The method of the present invention comprises coating a coating solution for forming a water-repellent film on the surface of a transparent substrate, such as sheet glass, etc., then drying and baking the thus-coated substrate to form a water-repellent film thereon.

In this method, the conditions for the drying step are controlled to have a temperature of from 15° C. to 25° C. and a relative humidity of 30% or less.

The reason why the drying temperature is defined at 15° C. or higher is because, if it is lower than 15° C., the drying time is prolonged. The reason why the drying temperature is defined at 25° C. or lower is because, if it is higher than 25° C., bubbles are often formed in the dried film. The reason why the relative humidity is defined to be 30% or less is because, if it is more than 30%, the coated film is locally and excessively hydrolyzed or the coated film is dried insufficiently so that the coated film still containing water therein is baked in the next baking step. If so, the water remained in the film is removed during the baking step and the finally obtained water-repellent film becomes porous.

For these reasons, the conditions for the drying step are controlled to have a temperature of from 15° C. to 25° C. and a relative humidity of 30% or less.

More preferably, the relative humidity in the drying step is from 15% to 20%. One reason is because, if the relative humidity is 20% or less, the hydrolysis of the coated layer is prevented and the dried film is prevented from becoming porous. However, if the relative humidity is less than 15%, the coated film is dried too rapidly so that it is often difficult to make the dried film have a uniform thickness.

To coat the coating solution for forming a water-repellent film on the surface of a substrate, a flow-coating process is preferred, in which the substrate to be coated is held at its top and bottom, a coating solution is applied to the top edge of the substrate via a nozzle so as to make the solution flow downward on the surface of the substrate. Other coating processes such as a dipping process, a spray-coating process, a spin-coating process, etc. may also be used.

The speed of the air stream to be applied to the coated substrate to dry it in the drying step shall be 0.5 m/min or lower- This is because, if the speed of the air stream is higher than 0.5 m/min, the thickness of the dried film often becomes uneven. Considering the drying time, the speed of the air stream is preferably 0.3 m/min or higher.

The coating solution to be used in the present invention for forming a water-repellent film contains ceramics having an $SiO_2$ content of 50% or more, of which the non-metallic atoms have been partly substituted by fluoroalkyl groups. The glass substrate to be coated according to the present invention includes sheet glass, for example, silicate glass such as hydrated silica glass, alkali silicate glass, lead-alkali glass, soda-lime glass, potash-lime glass, barium glass, etc., hydrated silica glass containing $B_2O_3$ and $SiO_2$, phosphate glass containing $P_2O_5$, etc. In place of such sheet glass, transparent resin plates can also be employed.

In the method of the present invention, the drying conditions for the drying step of drying the coated substrate are defined as mentioned above. Therefore, the water-repellent film to be formed on the substrate by baking the thus-dried film has a uniform thickness and good abrasion resistance.

The present invention is described in more detail by means of the following specific examples, which, however, are not intended to restrict the scope of the present invention.

The method of the present invention comprises a step of preparing a coating solution, a step of coating the solution on a substrate, a step of drying the coated film, and a step of baking the coated substrate. These steps are separately referred to in the following examples.

STEP OF PREPARING COATING SOLUTION

The following components (a) to (c) were stirred for 20 minutes.

(a) Tetraethoxysilane ($Si(OC_2H_5)_4$) 200.00 g (b) Fluoroalkylsilane ($CF_3(CF_2)_7CH_2CH_2Si(OCH_3)_3$) 5.46 g (c) Ethanol 1706.40 g The following components (d) and (e) were added to the above and stirred for 2 hours.

(d) Water 85.00 g (e) Aqueous solution of 0.1-N HCl 105.40 g

The mixed solution thus prepared was put in a container, and the container was sealed and stored at 25° C. for 10 days. After this, the solution was diluted with methanol to be a 1/5 dilution. This is used as the coating solution in the next step.

COATING STEP

The coating solution prepared in the previous step was coated on one surface of sheet glass by a flow process. Concretely, the sheet glass to be coated was held at its top and bottom, and the coating solution was applied to the top edge of the sheet glass via a nozzle at a flow rate of 200 cc/min.

DRYING STEP

The thus-coated sheet glass was dried in a drying room that had been conditioned at 21° C. and 18% RH, into which an air stream was introduced at a speed of from 0.3 m/min to 0.5 m/min. After being dried, a wet film was formed on the surface of the sheet glass.

BAKING STEP

The sheet glass coated with the wet film was heated in air at 120° C. for 20 minutes, by which water and ethanol were removed from the film. Next, this was heated at 250° C. for 1 hour, by which a water-repellent film was formed on the sheet glass.

Varying the temperature and the humidity in the drying step to those shown in the following table, various samples each coated with a water-repellent film were prepared. The characteristics of the water-repellent films are shown in the following table.

TABLE

| | Conditions for Drying | | Properties | |
| --- | --- | --- | --- | --- |
| | Temperature (°C.) | Humidity (%) | Outward Appearance | Contact Angle after back-and-forth rubbing |
| Example 1 | 20 | 20 | Not hazed | 94° |
| Example 2 | 20 | 27 | Not hazed | 91° |
| Example 3 | 20 | 15 | Not hazed | 96° |
| Example 4 | 15 | 30 | Not hazed | 93° |
| Example 5 | 15 | 20 | Not hazed | 95° |
| Example 6 | 15 | 15 | Not hazed | 99° |
| Example 7 | 25 | 30 | Not hazed | 88° |
| Example 8 | 25 | 20 | Not hazed | 91° |
| Example 9 | 25 | 15 | Not hazed | 95° |
| Comparative Example 1 | 20 | 40 | Hazed | 60° |
| Comparative Example 2 | 20 | 31 | Hazed | 63° |
| Comparative Example 3 | 20 | 14 | Hazed | 65° |
| Comparative Example 4 | 26 | 20 | Hazed | 58° |
| Comparative Example 5 | 14 | 20 | Hazed | 61° |

As is known from the above-mentioned table, the samples of Examples 1 to 9 that had been dried under the specifically controlled conditions having a temperature falling between 15° C. and 25° C. and a relative humidity of 30% or less were not hazed and had a large contact angle even after having been rubbed back and forth. The results mean that the water-repellent films formed in these example were transparent and had good abrasion resistance. In particular, the films that had been dried at a relative humidity falling between 15% and 20% were very good.

As opposed to these, the samples of Comparative Examples 1 to 5 that had been dried at temperatures and relative humidities overstepping the defined ranges were hazed. In addition, these had a small contact angle after having been rubbed back and forth. From the results, it is known that these comparative samples had poor abrasion resistance.

Therefore, it is clear that the temperature condition and the relative humidity condition in the drying step have a great influence on the properties, (transparency, abrasion resistance) of the water-repellent film to be formed. It is understood that the water-repellent films formed according to the method of the present invention where the drying step is conducted under the specifically controlled conditions (temperature, relative humidity) had high transparency and good abrasion resistance.

As is clear from the above-mentioned description and the experimental results shown in the table above, when the drying step in the method of forming a water-repellent film on the surface of sheet glass is specifically controlled to have a temperature falling between 15° C. and 25° C. and a relative humidity of 30% or less, preferably from 15% to 20%, while the speed of the air stream to be applied to the film being dried is controlled at 0.5 m/min or lower, the film being dried does not take in water from the ambience and is not locally hydrolyzed during the drying step. Therefore, the film thus dried under the specifically controlled conditions can be baked to be a water-repellent film having a uniform thickness and good abrasion resistance.

While the invention has been described in detail and with reference to specific embodiments thereof, it will be apparent to one skilled in the art that various changes and modifications can be made therein without departing from the spirit and scope thereof. The scope of the invention is indicated by the appended claims.

What is claimed is:

1. A method for forming a water-repellent film, comprising the steps of:

coating a coating solution for forming a water-repellent film on the surface of a transparent substrate, then drying the coated surface and baking the coated substrate to thereby form a water-repellent film thereon, a temperature in said drying step being controlled to fall in a range of from 15° C.–25° C., and a relative humidity in said drying step being controlled to fall between 15% and 20%;

said coating solution containing ceramics having an $SiO_2$ content of at least 50% and in which non-metallic atoms have been partly substituted by fluoroalkyl groups; and said drying step including applying an airstream to the coated surface of the substrate, a speed of the airstream applied to the coated substrate in said drying step being 0.5 m/min or lower.

2. The method for forming the water-repellent film as claimed in claim 1, in which said coating step includes a flow process where the substrate is held at its top and bottom and the coating solution is applied to the top edge of the substrate via a nozzle.

3. The method for forming the water-repellent film as claimed in claim 1, in which the speed of the air stream in said drying step is from 0.3 m/min to 0.5 m/min.

4. The method for forming the water-repellent film as claimed in claim 1, in which said coating solution contains tetraethoxysilane and fluoroalkylsilane.

* * * * *

UNITED STATES PATENT AND TRADEMARK OFFICE
CERTIFICATE OF CORRECTION

PATENT NO.  : 5,693,365
DATED       : December 2, 1997
INVENTOR(S) : Toyoyuki Teranishi, Hiroaki Yamamoto, Satoshi Shiiki, Kazuaki Takada, Kazuo Tojima, Takashi Itoh It is certified that error appears in the above-indentified patent and that said Letters Patent is hereby corrected as shown below:

```
On the cover page, in the Abstract, line 5, before "preferably"
     insert --less, --.

Column 3, line 10, change "In In" to --In--;
         line 12, change "snob" to --such--.

Column 4, line 8, change "lower-" to --lower.--.
```

Signed and Sealed this

Seventeenth Day of February, 1998

*Attest:*

BRUCE LEHMAN

*Attesting Officer*      *Commissioner of Patents and Trademarks*